United States Patent Office 3,445,379
Patented May 20, 1969

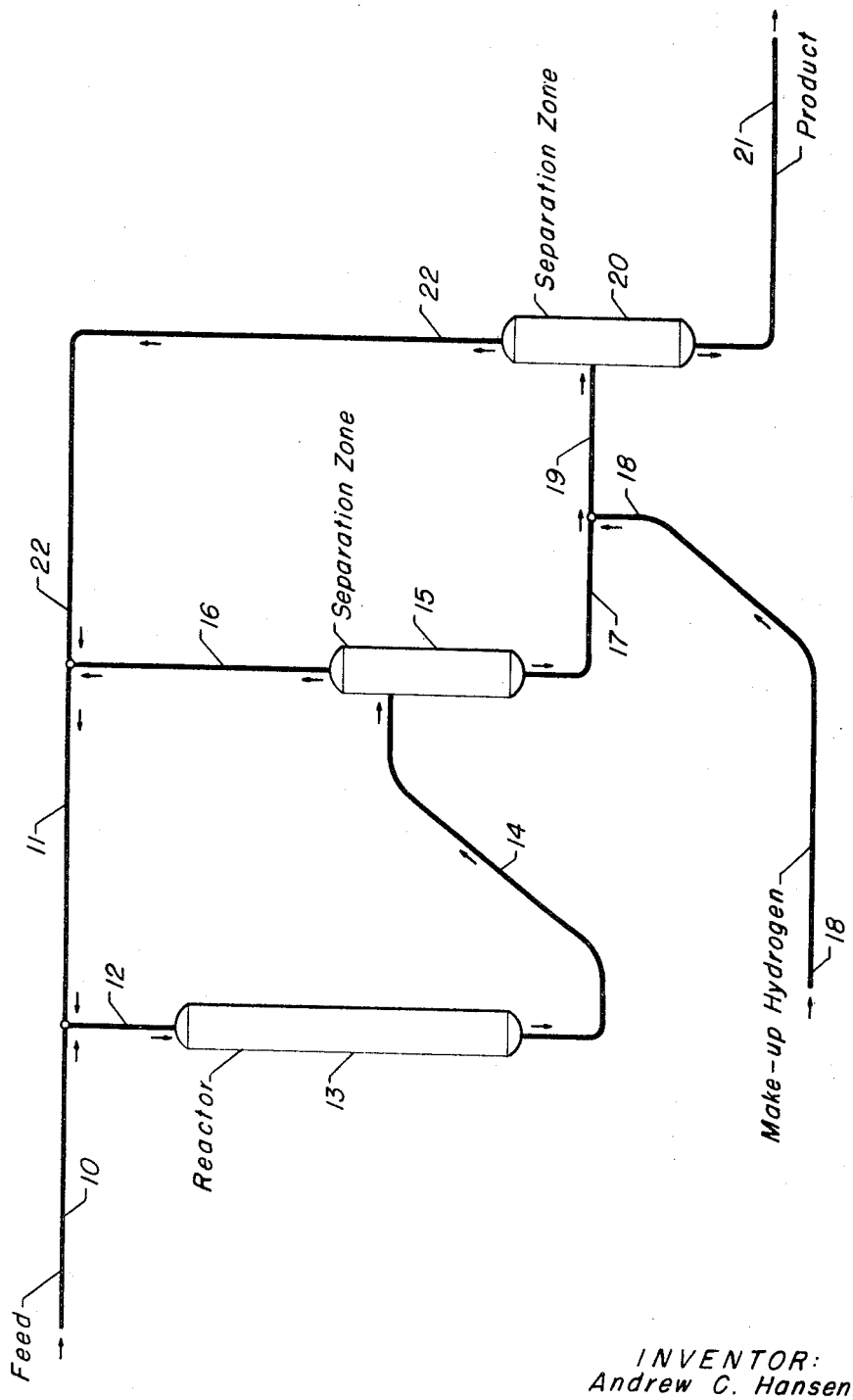

3,445,379
METHOD FOR CONVERTING HYDROCARBONS
Andrew C. Hansen, Jr., Palatine, Ill., assignor to Universal Oil Products Company, Des Plaines, Ill., a corporation of Delaware
Filed Apr. 13, 1967, Ser. No. 630,556
Int. Cl. C10g *13/00, 23/00*
U.S. Cl. 208—107                               6 Claims

ABSTRACT OF THE DISCLOSURE

Method for converting hydrocarbons under conditions which consume hydrogen. The effluent from the reaction zone is passed through two separation stages, one at high pressure and then one at low pressure. Relatively impure makeup hydrogen is physically admixed with the converted hydrocarbons prior to the low pressure separator. Relatively pure makeup hydrogen is passed from the low pressure separator back to the reaction zone. The invention is applicable generally to hydrogenation reaction processes.

BACKGROUND OF THE INVENTION

This invention relates to a method for converting hydrocarbons. It particularly relates to a method for hydrogenating hydrocarbons. It especially relates to the hydrogenation of naphtha for the removal of sulfur therefrom.

It is well known in the prior art to remove contaminants such as sulfur and nitrogen compounds from hydrocarbon feedstocks using catalytic means for converting, for example, the sulfur compounds to hydrogen sulfide and the nitrogen compounds to ammonia. Typically, the feedstock to be refined is passed over a suitable hydrogenation catalyst at an elevated temperature and pressure to cause such conversion reactions to take place. The hydrogen sulfide and ammonia are removed from the effluent products, for example, by water washing and/or liquid absorption with the desired refined products being recovered from the effluent by fractionation means.

Usually, the source of hydrogen for the hydrogenating reaction is a hydrogen producing plant such as a pyrolysis unit or a catalytic reformer unit for the production of gasoline. Other extraneous sources of hydrogen are well known to those skilled in the art. The production of hydrogen is a significantly expensive operation and normally the economics of a hydrogenation reaction will depend to a considerable extent upon the ease with which hydrogen is available. In those industries, such as the petroleum industry, which utilize the hydrogenation reaction for the production of various chemical products, there is a surplus of hydrogen available for hydrogenating reactions such as this invention is directed. However, frequently in some areas of the word, and more particularly, in certain operations the particular refiner or manufacturer has an actual shortage of hydrogen or has only a limited supply of hydrogen available.

Accordingly, it would be desirable to operate the hydrogenation reaction with a minimum requirement of extraneous hydrogen in a facile and economical manner.

SUMMARY OF THE INVENTION

Therefore, it is an object of this invention to provide a method for the conversion of hydrocarbons.

It is another object of this invention to provide a method for hydrogenating hydrocarbons.

It is still another object of this invention to provide a method for hydrogenating hydrocarbons in a facile and economical manner whereby added hydrogen requirements have been reduced.

Therefore, according to the present invention, there is provided a method for the conversion of hydrocarbons in the presence of hydrogen which comprises converting feed hydrocarbons in a reaction zone under hydrogen consuming conditions; separating the effluent from the reaction zone under relatively high pressure into a hydrocarbon liquid phase and a hydrogen-containing gas phase; returning the hydrogen-containing gas phase to the reaction zone; admixing said hydrocarbon liquid phase with relatively impure makeup hydrogen; separating the admixture under relatively low pressure into a relatively pure makeup hydrogen stream and a conversion product stream; and, returning all of said relatively pure makeup hydrogen stream to the reaction zone.

As previously mentioned, this invention is uniquely applicable to the hydrogenating reaction. As used herein, the term "hydrogenating" is intended to embody the operations whereby hydrogen is consumed for olefin saturation, sulfur removal, nitrogen removal, and/or the like; and operations whereby the hydrogen is consumed during a cracking reaction which converts hydrocarbons into more saturate lower molecular weight hydrocarbons, e.g. hydrocracking.

Suitable feedstocks for the hydrogenation reaction include various kerosene or mixed naphtha fractions which are treated with hydrogen in order to provide more suitable feedstocks for other operations or to provide a more suitable fuel oil. Refining with hydrogen is also used in treating petroleum-derived hydrocarbon fractions of the middle distillate boiling range and above. Generally, these heavier hydrocarbon fractions are thereafter utilized as charge stocks to hydrocracking processes for the purpose of producing lower boiling kerosene and gasoline boiling range fractions. Such heavier hydrocarbon fractions include light and heavy gas oils, lubricating oil and white oil stocks, black oil and cracking oil stocks, vacuum gas oils, and the various high boiling bottoms recovered from the fractionators which generally form an integral part of the catalytic cracking operation. The concentration of contaminants contained in these heavier hydrocarbon fractions may be as high as from 3.0% to about 5.0% by weight of sulfur and as high as about 1,000 to 5,000 parts per million by weight (p.p.m.) of nitrogen. In other aspects, as previously mentioned, the hydrotreating process or hydrogenating reaction is often utilized for the purpose of providing a substantially saturated normally liquid hydrocarbon product. The present invention is distinctly applicable to the hydrogen treatment of relatively light naphtha fractions for the removal of sulfur compounds therefrom.

In general, the hydrogenating reaction is conducted by admixing the hydrocarbon charge stock with hydrogen in an amount within the range from 500 to 10,000 standard cubic feet per barrel of liquid hydrocarbon charge (s.c.f./b.). This mixture of hydrocarbons and hydrogen is then raised to a temperature of from, say, 500° F. to 1400° F. and contacts the suitable catalytic composite at a liquid hourly space velocity (volume of liquid per hour per volume of catalyst) from about 0.2 to 15.0. Usually the pressure imposed on the reaction zone will be from, say, 100 p.s.i.g. to 3,000 p.s.i.g. For hydrotreating purposes, these conditions will convert organically bound nitrogen compounds into ammonia and sulfur compounds, such as mercaptans, thiophenes, etc., into hydrogen sulfide. For hydrocracking reactions, of course, the relatively higher molecular weight hydrocarbons are fragmented into lower molecular weight hydrocarbons with saturation of olefinic bonds present in the feed hydrocarbon. The precise operating conditions are dependent to a certain extent upon the chemical and/or physical characteristics of the particular hydrocarbon charge stock. Those skilled in the art familiar with the general area of hydrogenation and from a knowledge of the invention presented herein will know how to choose the proper operating conditions for either the hydrotreating process or hydrocracking process, both being for convenience combined herein into the single term "hydrogenation."

The hydrogenating catalysts which are used by those skilled in the art for the purpose set forth herein generally consist of a composite of a refractory inorganic oxide carrier material and at least one metallic component selected from the metals and compounds of Group VI–A and VIII of the Periodic Table. Thus, the hydrogenating catalyst composite may comprise a metal from the group of molybdenum, tungsten, chromium, iron, cobalt, nickel, and in many specified instances, members of the platinum group, particularly, platinum and/or palladium. One or more of these catalytically active metal components are combined with a refractory inorganic oxide carrier material selected from the group consisting of alumina, silica, thoria, hafnia, zirconia, magnesia, strontia, mixtures of two or more, etc. The preferred catalytic composite is generally an alumina-carrier material with from about 10% to about 40% by weight of silica, molybdenum and an iron group metallic component. In those instances involving hydrocarbon charge stocks boiling substantially above a temperature of about 750° F. the carrier material for the catalytic composite may consist of alumina and from 10% to about 90% by weight of silica. In similar manner, catalytic composites of an alumina-silica carrier material and one or more of the foregoing metallic components from Groups VI–A and VIII are widely used by the prior art in processes for hydrocracking heavier hydrocarbon fractions to produce lower boiling hydrocarbon products. In some instances, the prior art has frequently used a cobalt-molybdate catalytic composite supported on an alumina base. Any of the hydrogenation catalysts known to those skilled in the art will be satisfactory in the practice of this invention.

In substance, therefore, the present invention involves a method for hydrogenating hydrocarbons whereby the makeup hydrogen is physically admixed with the hydrogenated product stream prior to a relatively low pressure separation. The gaseous stream from the low pressure separation contains the makeup hydrogen and is therefore returned to the reaction zone in admixture, preferably, with the hydrogen containing gaseous stream from the high pressure separator. By operating in this fashion, it was found that the high molecular weight impurities in the incoming hydrogen gas were absorbed by the product stream liquid hydrocarbons thereby improving the purity of the makeup hydrogen stream which passes then into the reaction zone. Generally, this invention will be applicable for makeup hydrogen stream purities of less than 85 mol percent; although, minor deviations from this percentage can also be utilized satisfactorily. It is also to be noted from the description of the invention presented so far that the makeup hydrogen which is admixed with the product stream prior to the low pressure separator is the sole source of extraneous hydrogen which is added to the system. There is also a unique feature wherein the present method operates without venting of a hydrogen-containing stream. It was surprising to find that even without venting there was no abnormal build-up of methane and/or $H_2S$ impurities in the circulating hydrogen stream. Also, as will become evident from the illustrative example presented hereinbelow, the practice of the present invention permits the use of considerably less extraneous hydrogen than has heretofore been required by the practice of a typical prior art scheme.

The invention may be more fully understood with reference to the appended drawing which is a diagrammatic representation of apparatus suitable for use in the practice of this invention.

DESCRIPTION OF THE DRAWING

Referring now to the drawing, a naphtha feedstock, e.g. a hydrocarbon stream boiling generally between the range of 100° F. and 400° F. is introduced into the system via line 10. A recycle hydrogen stream, more fully defined hereinbelow, is admixed with the feed hydrocarbons from line 11 and the total mixture is passed via line 12 into hydrogenation reactor 13 which preferably contains a catalytic composite well known to those skilled in the art. Usually, the hydrogenation reaction is operated at an elevated temperature and elevated pressure.

The effluent from the reactor 13 is removed via line 14, cooled by means not shown, and introduced at relatively high pressure (allowing for normal pressure drop between the reactor and the separator) into separator 15. There are conditions imposed on separator 15 wherein a hydrogen-containing stream is removed via line 16, a liquid hydrocarbon stream containing converted hydrocarbons or hydrogenated hydrocarbons is withdrawn from separator 15 via line 17. Sufficient makeup hydrogen of a purity of generally less than about 85% by mol is added to the system via line 18. The combined makeup hydrogen stream and liquid hydrocarbon stream is passed via line 19 at a relatively low pressure into separator 20. In the practice of this invention it is distinctly preferable that relatively high pressure separator 15 be at least 200 p.s.i.g. higher pressure than low pressure separator 20. By intimately admixing the makeup hydrogen stream with the liquid hydrocarbon stream in line 17, the relatively high molecular weight hydrocarbons, such as the $C_2$, $C_3$, $C_4$, $C_5$ and $C_{6+}$ hydrocarbons which are part of the makeup hydrogen stream in line 18, are substantially absorbed by the hydrocarbon phase. Therefore, under the conditions of relatively low pressure imposed on separator 20, the gaseous stream containing hydrogen, which is removed via line 22, contains hydrogen of greater purity than that added via line 18. The hydrogenated product containing stream is removed via line 21 and passed out of the system typically into a separation system whereby the desired hydrocarbons are recovered usually by distillation.

The relatively pure makeup hydrogen stream now in line 22 is preferably compressed by means not shown to the reactor pressure. Preferably, the compressed relatively pure makeup hydrogen stream in line 22 is admixed with the high pressure hydrogen-containing gas in line 16 and passed via line 11 into admixture with the incoming feed stream as hereinabove described.

It is noted that in the practice of the invention that the material in line 22 must of necessity be compressed to reactor pressure. Since the makeup hydrogen stream is usually from a catalytic reforming operation it too must also be compressed. Therefore, a single compressor may be utilized for handling this stream, and low pressure separator 20, in effect acts, as a knock-out pot for the compressor thereby eliminating one piece of equipment. It was also found that in the practice of this invention that the utilization of the makeup hydrogen in this manner results in a decreased requirement for extraneous hydrogen. In other words, the hydrogen is utilized and recovered more efficiently than has heretofore been practice in a typical prior art operation.

The following examples will serve to illustrate one embodiment of the invention.

*Example I*

This example illustrates the results obtainable in a typical operation of the process with reference to the attached drawing. The feed is a straight-run naphtha having a normal boiling point of about 295° F., an API gravity of 51.5°, and containing about 0.05% by weight sulfur. The hydrogenating catalyst is composed of cobalt-molybdate on alumina. The operating conditions are as follows:

|  | Reactor 13 | Separator 15 | Separator 20 |
| --- | --- | --- | --- |
| Temperature, ° F | 800 | 100 | 100 |
| Pressure, p.s.i.g | 865 | 765 | 215 |
| LHSV | 0.5 | | |
| $H_2$/oil, s.c.f./b | 800 | | |

Operating in accordance with the practice of the invention as shown in the drawing produced the following material balance (in mols per hour):

| Component | Line No. | | | | | | | | |
|---|---|---|---|---|---|---|---|---|---|
| | 10 | 11 | 12 | 14 | 16 | 18 | 19 | 21 | 22 |
| $H_2S$ | | 4.66 | 4.66 | 9.66 | 3.54 | | 6.12 | 5.00 | 1.12 |
| $H_2$ | | 1,846.95 | 1,846.95 | 1,715.32 | 1,669.78 | 143.51 | 189.05 | 11.88 | 177.17 |
| $C_1$ | | 169.61 | 169.61 | 170.79 | 141.71 | 13.51 | 42.59 | 14.69 | 27.90 |
| $C_2$ | | 7.29 | 7.29 | 7.92 | 4.02 | 7.83 | 11.73 | 8.46 | 3.27 |
| $C_3$ | | 1.19 | 1.19 | 2.05 | 0.51 | 5.03 | 6.57 | 5.89 | 0.68 |
| $iC_4$ | | 0.20 | 0.20 | 0.85 | 0.11 | 1.06 | 1.79 | 1.71 | 0.08 |
| $nC_4$ | | 0.15 | 0.15 | 0.80 | 0.08 | 1.25 | 1.97 | 1.90 | 0.07 |
| $iC_5$ | | 0.06 | 0.06 | 0.85 | 0.04 | 0.58 | 1.39 | 1.37 | 0.02 |
| $nC_5$ | | 0.03 | 0.03 | 0.55 | 0.02 | 0.30 | 0.83 | 0.82 | 0.01 |
| Added $C_{6+}$ | | 0.00 | 0.00 | 0.00 | 0.00 | 1.21 | 1.21 | 1.21 | 0.00 |
| Naphtha Chg | 1,516.27 | | 1,516.27 | | | | | | |
| Naphtha Prod | | 1.29 | 1.29 | 1,516.35 | 1.02 | | 1,515.34 | 1,515.06 | 0.28 |
| Total | 1,516.27 | 2,031.43 | 3,547.70 | 3,425.14 | 1,820.83 | 174.27 | 1,778.58 | 1,567.98 | 210.60 |

It is noted from the above results that the $C_{6+}$ added by the relatively impure makeup hydrogen stream (line 18) is completely removed from the system with the product (line 21) and is not recycled through the reactor. Thus, the relatively impure hydrogen (82.6%) added via line 18 becomes improved in purity (84.2%) in line 22 for recycle to the reactor. It is also to be noted that all of the gaseous material from the low pressure separator 20 is returned to the reaction zone and that there was no significant build-up of either $H_2S$ or methane which would require a hydrogen vent or purge.

*Example II*

This example illustrates the results obtainable in a prior art operation wherein the gaseous stream from the low pressure separator is vented or purged and the makeup hydrogen is added to the feed to the reactor. For comparison purposes, reference can be made to the appended drawing by visualizing the above changes to create the typical prior art process (all operating conditions remain the same as in Example I).

liquid phase and a hydrogen-containing gas phase; returning the hydrogen-containing gas phase to the reaction zone; admixing said hydrocarbon liquid phase with relatively impure makeup hydrogen; separating the admixture under a lower pressure than said high pressure into a relatively pure hydrogen stream and a conversion product stream; and, introducing all of said relatively pure hydrogen stream to the reaction zone.

2. Method according to claim 1 wherein said conditions are hydrogenating conditions suitable for the removal of sulfur compounds from feed hydrocarbons.

3. Method according to claim 1 wherein said conditions are hydrocracking conditions suitable for converting the feed hydrocarbons into lower boiling materials.

4. Method according to claim 2 wherein the feed hydrocarbons comprise a sulfur-containing naphtha stream.

5. Method according to claim 4 wherein said relatively high pressure is at least 200 p.s.i.g. greater than said relatively low pressure.

6. Method according to claim 5 wherein said relatively high pressure is more than 500 p.s.i.g. and said relatively low pressure is less than 500 p.s.i.g.

| Component | Line No. | | | | | | | | |
|---|---|---|---|---|---|---|---|---|---|
| | 10 | 11 | 12 | 14 | 16 | 18 [1] | 19 | 21 | Vent 22 |
| $H_2S$ | | 2.76 | 2.76 | 7.76 | 2.76 | | 5.00 | 4.80 | 0.21 |
| $H_2$ | | 1,846.97 | 1,846.97 | 1,715.34 | 1,668.29 | 178.68 | 47.06 | 12.07 | 34.98 |
| $C_1$ | | 100.39 | 100.39 | 101.57 | 83.76 | 16.03 | 17.81 | 13.01 | 4.80 |
| $C_2$ | | 19.71 | 19.71 | 20.34 | 10.07 | 9.64 | 10.27 | 9.55 | 0.72 |
| $C_3$ | | 8.36 | 8.36 | 9.22 | 2.17 | 6.19 | 7.05 | 6.90 | 0.15 |
| $iC_4$ | | 1.57 | 1.57 | 2.22 | 0.27 | 1.30 | 1.95 | 1.93 | 0.02 |
| $nC_4$ | | 1.76 | 1.76 | 2.41 | 0.22 | 1.54 | 2.19 | 2.17 | 0.02 |
| $iC_5$ | | 0.78 | 0.78 | 1.57 | 0.07 | 0.71 | 1.50 | 1.50 | 0.00 |
| $nC_5$ | | 0.40 | 0.40 | 0.92 | 0.03 | 0.37 | 0.89 | 0.89 | 0.00 |
| Added $C_{6+}$ | | 1.50 | 1.50 | 1.50 | 0.00 | 1.49 | 1.49 | 1.49 | 0.00 |
| Naphtha Chg | 1,516.27 | | 1,516.27 | | | | | | |
| Naphtha Prod | | 0.88 | 0.88 | 1,515.94 | 0.88 | | 1,515.06 | 1,515.01 | 0.05 |
| Total | 1,516.27 | 1,985.08 | 3,501.33 | 3,378.79 | 1,768.51 | 216.55 | 1,610.28 | 1,569.33 | 40.95 |

[1] Added to line 16.

One important item to note from the above data is that about 217 moles per hour of hydrogen makeup gas is required to produce a low sulfur product. On the other hand, the invention as shown in Example I only requires 174 moles per hour of hydrogen to produce the same quality product.

PREFERRED EMBODIMENT

Therefore, from the presentation hereinabove, a preferred embodiment of the present invention includes a hydrogenating reaction wherein the relatively high pressure separator is at least 200 p.s.i.g. higher than the relatively low pressure separator.

The invention claimed is:

1. Method for the conversion of hydrocarbons in the presence of hydrogen which comprises converting feed hydrocarbons in a reaction zone under hydrogen consuming conditions; separating the effluent from the reaction zone under relatively high pressure into a hydrocarbon

References Cited

UNITED STATES PATENTS

| | | | |
|---|---|---|---|
| 2,918,425 | 12/1959 | Berger et al. | 208—209 |
| 2,983,669 | 5/1961 | Noll | 208—209 |
| 3,101,380 | 8/1963 | Hariu | 208—100 |
| 3,349,145 | 10/1967 | Uitti | 23—210 |
| 3,204,007 | 8/1965 | Mukai et al. | 260—672 |
| 3,101,380 | 8/1963 | Hariu | 260—672 |
| 3,089,843 | 5/1963 | Eastman et al. | 208—107 X |
| 3,362,903 | 1/1968 | Eastman et al. | 208—143 |
| 3,291,849 | 12/1966 | King et al. | 260—672 |
| 3,322,842 | 5/1967 | Cjajkowski et al. | 260—672 |

DELBERT E. GANTZ, *Primary Examiner.*

G. E. SCHMITKONS, *Assistant Examiner.*

U.S. Cl. X.R.

208—111, 213; 260—672